United States Patent [19]
Frederick

[11] 4,116,060
[45] Sep. 26, 1978

[54] MASS FLOW SENSOR AND METHOD

[75] Inventor: Gary L. Frederick, Tempe, Ariz.

[73] Assignee: The Garrett Corporation, Los Angeles, Calif.

[21] Appl. No.: 860,549

[22] Filed: Dec. 14, 1977

Related U.S. Application Data

[63] Continuation-in-part of Ser. No. 747,119, Dec. 2, 1976, abandoned.

[51] Int. Cl.² ............................................. G01F 1/32
[52] U.S. Cl. ............................................. 73/194 VS
[58] Field of Search ........... 73/194 B, 194 VS, 194 M

[56] References Cited

U.S. PATENT DOCUMENTS

| | | | |
|---|---|---|---|
| 2,813,424 | 11/1957 | Liepmann et al. | 73/194 |
| 3,810,388 | 5/1974 | Cousins et al. | 73/194 |
| 3,948,097 | 4/1976 | Kurita et al. | 73/194 |

*Primary Examiner*—Herbert Goldstein
*Attorney, Agent, or Firm*—James W. McFarland; Albert J. Miller

[57] ABSTRACT

A true mass flow sensor utilizing a bluff body in the mass flow to generate periodic vortices therein, in combination with method and apparatus for adjusting generation of the vortices such that the frequency thereof is indicative of the mass flow.

36 Claims, 10 Drawing Figures

MASS FLOW SENSOR AND METHOD

BACKGROUND OF THE INVENTION

This is a continuation-in-part application of my co-pending U.S. patent application Ser. No. 747,119, filed Dec. 2, 1976 now abandoned.

This invention relates to flow sensors, and relates more particularly to a true mass flow sensor.

Prior art fluid flow measurement is most commonly performed by positive displacement meters, turbine meters, or restrictiontype flow meters. Positive displacement flow meters, turbine flow meters, anemometers, and bluff body-type flow meters measure only volumetric flow rate. Measurement of mass flow requires correction of such volumetric flow signals for fluid density changes which in a liquid flow is a function of the temperature of the liquid, while a gas flow density correction must be made as a function of both pressure and temperature of the fluid.

Restrictive type of prior art meters operate on a principle that a restriction in a fluid stream creates a pressure drop which is a function of mass flow rate for a given set of fluid parameters. For accurate measurement of flow, parameters such as pressure ratio, Reynold's number, orifice configuration, and fluid compressibility must be measured accurately. Methods to automate such computations require use of either transducers and electronic computation or complex mechanical mechanisms which are undesirable for most industrial, military, and commercial applications.

True mass flow sensors presently available operate on the principle of fluid inertia measurement. Such devices utilize measurement of coriolis force, gyroscopic effect, or angular momentum. However, such prior art true mass flow sensors are both expensive and relatively unreliable.

Prior art volumetric flow meters of the bluff body type are based upon the phenomenon of vortex-shedding behind a bluff body disposed in the flow stream. For a wide range of Reynold's number, a regular pattern of vortices is generated by such a bluff body in the flow stream. The frequency of these vortices is directly proportional to the stream velocity past the body. When installed in a moving stream, a wide variety of bluff body shapes generate a wake consisting of a series of vortices. It is believed these vortices form in the boundary layer around the body and grow until they separate and are shed into the flow stream. A regular pattern of alternating clockwise and counterclockwise vortices are generated from Reynold's numbers from about 60 to over 200,000. The frequency of the periodic vortices is directly proportional to the flow velocity past the body and inversely proportional to the characteristic dimension of the bluff body in a direction substantially perpendicular to the direction of fluid flow. More specifically, the volumetric flow rate multiplied by the Strouhal number and divided by the characteristic dimension is equal to the frequency of vortex shedding. For a particular shape of bluff body, such as the cylindrical body, the Strouhal number is constant for Reynold's numbers greater than 600. Accordingly within the appropriate Reynold's number range, the frequency is determined by the stream velocity divided by the characteristic dimension and multiplied by a constant. For determining mass flow in using such volumetric flow meters, separate sensing of the fluid temperature and/or pressure must also be accomplished to correct for density changes in the mass flow. Then, appropriate computation must be made of these sensed parameters in order to generate a mass flow sensor.

SUMMARY OF THE INVENTION

It is a primary object of the present invention to provide a true mass flow sensor based upon the bluff body, vortex-shedding principle. More particularly, it is an important object of the present invention to provide a vortex-shedding type flow sensor which generates vortices at a frequency which is a function of mass flow rather than volumetric flow rate.

Another important object of the present invention is to provide apparatus and method for accomplishing the object set forth in preceding paragraph, which includes the intrinsic compensation of the vortex shedding in relation to the density of the mass flow being measured.

Accordingly, the present invention contemplates an improved mass flow sensor and method of extreme simplicity, economy and greater reliability of operation in comparison to previous mass flow sensors.

More particularly, the present invention contemplates a bluff body type of flow meter operating on the relationships set forth previously. Considering that mass flow is determined by density times volumetric flow, and that volumetric flow in turn is a function of the cross-sectional flow area times the steam velocity, it can be seen that the frequency of the generated periodic vortices is inversely proportional to the product quantity of the cross-sectional area times the characteristic dimension of the bluff body. The present invention contemplates structure and method which varies the product quantity of cross-sectional area A times the characteristic dimension $d$, i.e. $A \times d$, in inverse proportion to the density of the mass flow. The frequency of the vortices then become a direct function of the mass flow rather than the stream velocity past the bluff body.

To accomplish this, the present invention contemplates method and apparatus for varying either the characteristic dimension $d$, or the cross-sectional area A, or both, such that the product quantity $A \times d$ is in inverse proportion to the density of the mass flow. In preferred arrangements, this is accomplished by expanding the bluff body characteristic dimension $d$ through use of a bellows which expands and contracts both in response to changes in pressure and/or temperature of the mass flow, or by use of a bimetallic element that expands and contracts in response to changes in temperature of the mass flow. In another arrangement the bellows or bimetallic element acts as a driving mechanism for adjusting the cross-sectional area A in response to changes of temperature and/or pressure.

These and other more particular objects and advantages in the present invention are specifically set forth in or will become apparent from the following detailed description of preferred forms of the invention when read in conjunction with the accompanying drawings.

DETAILED DESCRIPTION OF THE PREFERRED EMBODIMENTS

Figure 1:
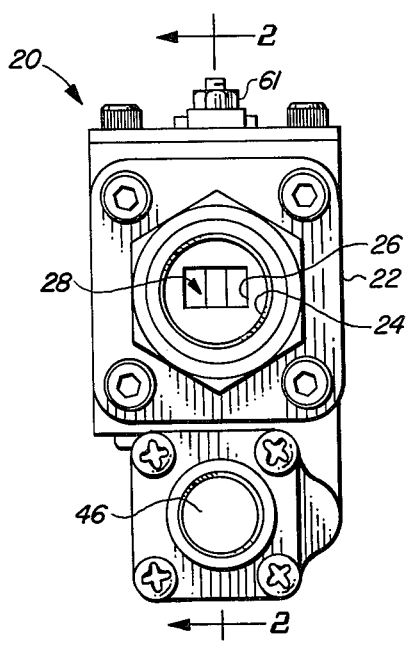
FIG. 1 is a front elevational view of the mass flow sensor constructed in accordance with the principles of the present invention.
Figure 2:
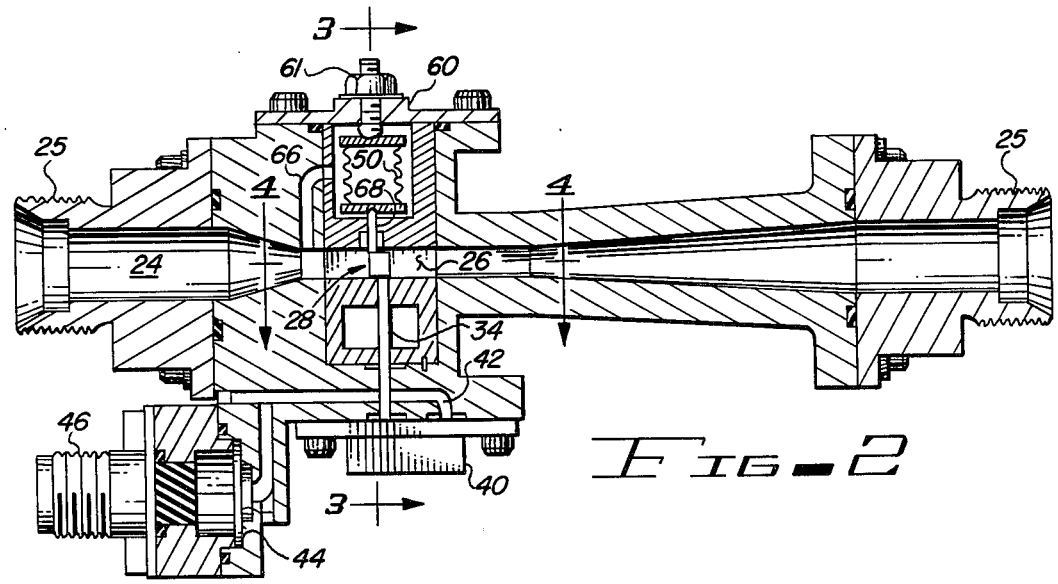
FIG. 2 is a cross-sectional elevational view taken along the lines of 2—2 of FIG. 1.
Figure 4:
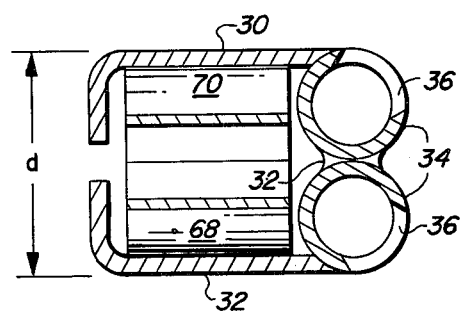
FIG. 4 is an enlarged, plan cross-sectional view along the lines of 4—4 of the expandable bluff body.

Referring now more particularly to the FIGS. 1-5 of the drawings, there is illustrated a mass flow sensor as contemplated by the present invention generally denoted by the numeral 20. The sensor includes a housing 22 which may be comprised of several different components as illustrated in FIG. 2, which housing defines an internal conduit opening 24 therewithin having appropriate fittings 25 at opposite ends connectable with an existing mass flow transmitting conduit. The conduit 24 has a reduced diameter, rectangular cross-sectional section 26.

Disposed within section 26 is a bluff body 28 having a pair of spaced sidewalls 30, 32 defining a distance $d$ therebetween in a direction substantially perpendicular to the direction of fluid flow through section 26. The bluff body 28 cooperates with section 26 to define a fluid flow transmitting area A between the sidewalls 30, 32 and the periphery of the section 26. Preferably, the bluff body is arranged such that the width of section 26 in the direction of the distance $d$, is at least three times the length of distance $d$. At the rearward end of bluff body 28 relative to the direction of mass flow, the bluff body includes a pair of vertical sensor tubes 34 intersecured such as by weld joint 38. Each of the walls 30, 32 are attached to the associated sensor tubes 36 in cantilever arrangement.

The sensor tubes 34 have openings 36 therein for receiving vortices shed from the bluff body, and as illustrated in FIG. 2 the sensor tubes 36 extend downwardly through housing 22 to a transducer arrangement which may include a fluidic stack 40 that is operable to amplify the pressure fluctuations sensed by tubes 34. The sensed pressure fluctuations are transmitted through a passage 42 to a piezo ceramic transducer 44 that is operable to generate an electrical voltage output whose frequency is responsive to the frequency of the pressure fluctuations sensed by tubes 34. Through an appropriate electrical outlet 46 the sensed electrical frequency signal may be transmitted to a desired readout, control, or other utilization device. The fluidic stack 40 and piezo ceramic transducer 44 are shown only in outline form, it being understood that such transducers are generally widely available and are known to those skilled in the art.

Figure 3:
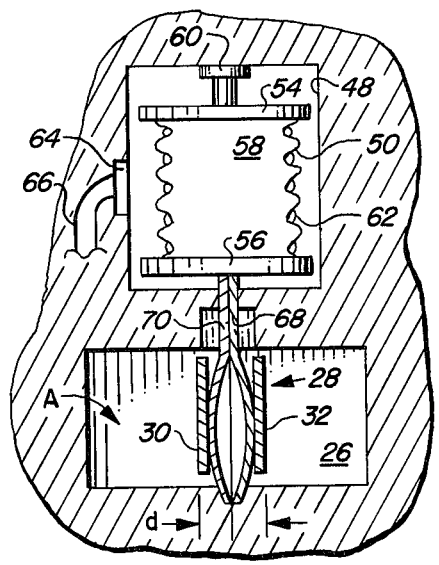
FIG. 3 is a cross-sectional view in enlarged form taken along the lines of 3—3 of FIG. 2 and showing the expanding bluff body and driving element associated therewith.

The invention further contemplates movable means in the form of a density compensator element which includes a bellows 50 disposed within a chamber 48 of housing 22. The flexible walls of bellows 50 cooperate with end plates 54, 56 thereof to define an enclosed interior 58 of the bellows. If desired, a spring or other biasing mechanism 62 may also be incorporated within the bellows. Upper plate 54 rests against or is secured to a stop 60 which is adjustable by rotation of an adjusting nut 61 disposed exteriorly of the housing 22. Secured to lower plate 56 are a pair of parallel compensating struts 68 and 70 which extend downwardly between sidewalls 30, 32 of bluff body 28. The lower ends of struts 68 and 70 are held rigidly by housing 22. Accordingly, in response to expansion and contraction of bellows 50, the compensator struts 70 and 68 shift vertically as illustrated in FIG. 3 so that their central bowed portions between walls 30, 32 will shift in a corresponding horizontal direction and thereby expand and contract the cantilevered sidewalls 30, 32 to alter the characteristic dimension $d$ of the bluff body. The interior 58 of bellows 50 is sealed and filled with fluid having the same temperature and pressure characteristics of the fluid flow in conduit 24. Chamber 48 communicates with mass fluid flow in conduit 24 via a port 64 and a passageway 66 in the housing.

In operation, mass fluid flow passes through conduit 24 and the section 26 in a left to right direction as viewed in FIG. 2. Within the desired operating range of the mass flow sensor, section 26 is sized such that the Reynold's number remains above 600. In flowing past bluff body 28, Karmann vortex sheets shed off of the bluff body, and the pressure fluctuations created by the periodically shedding vortices are sensed through openings 36 in sensor tubes 34. These pressure fluctuations are then amplified by fluidic amplifier 40, and transmitted to drive the piezo ceramic transducer 44. The pressure fluctuations acting upon the piezo ceramic transducer generate a voltage across the piezo ceramic transducer so that an electrical output signal from connection 46 is created whose frequency is indicative of the frequency of vortices shed by bluff body 28.

Figure 5:
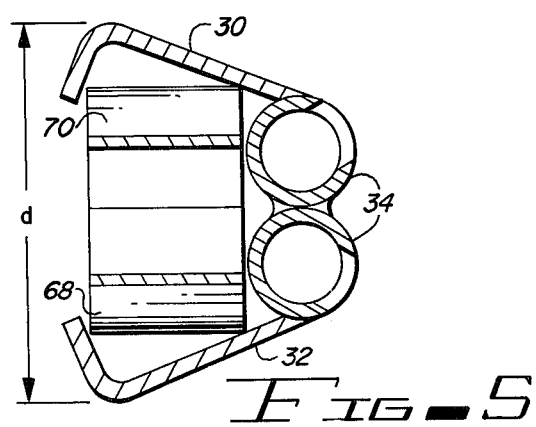
FIG. 5 is a view similar to FIG. 4 but showing the bluff body in a more expanded state.

Bellows 50 compensates for changes in density of the mass flow by correspondingly contracting and expanding to respectively drive the sidewalls 30, 32 toward and away from one another to thereby change the characteristic dimension $d$ of the bluff body 28. In this manner the frequency of the periodic vortices is varied in response to changes in density such that the sensed frequency of the vortices is indicative of the mass flow itself through section 26. For instance, assuming the mass fluid flow through conduit 24 to be a substantially incompressible liquid mass flow, the density of such liquid flow is responsive substantially only to changes in temperature of this liquid. Upon an increase of temperature of a mass flow, which accordingly reduces density of the liquid, increased temperature in chamber 48 causes expansion of liquid trapped within interior 58 of the bellows causing the bellows to expand. This causes the bowed sections of the struts 68, 70 to expand and move the sidewalls 30, 32 farther away from one another toward a configuration as illustrated in FIG. 5. In this manner a decrease in density of the liquid flow increases the characteristic dimension $d$ such that the frequency of the shed periodic vortices is indicative of the mass fluid flow.

If the conduit 24 is carrying a relatively compressible gaseous fluid flow, the density of this gas flow is a function of both changes in pressure and temperature. A trapped volume of gas having temperature and pressure characteristics like that of the gas flow in conduit 24 and preferably the same gas as in conduit 24, is then contained in the interior of sealed bellows 50. The trapped volume of gas in interior 58 of the bellows causes expansion and contraction of the bellows both in response to changes in pressure of the gas flow as well as changes in temperature of the gas delivered through passageway 66 to chamber 48. Temperature increase in chamber 48 causes expansion of the bellows to increase $d$ in response to the reduction in density, and pressure increase in chamber 48 (indicative of increased density) causes contraction of the bellows to reduce dimension $d$. Thus, similarly to the discussion above with respect to a liquid flow, the change in density of the gas flow causes a corresponding expansion or contraction of bellows 50 and resulting change in the characteristic dimension $d$ of the bluff body such that the frequency of the periodic vortices is indicative of the mass flow itself.

More specifically, the frequency of the periodic vortices being shed by the bluff body 28 is determined by the following equation:

$$f = KV/d, \quad (1)$$

where:
$f$ is the vortex shedding frequency;
$V$ is the stream flow velocity past the bluff body;
$d$ is the characteristic dimension of the bluff body;
$K$ is a constant related to the Strouhal number.

The stream velocity and the mass flow rate are defined by the following well-known equations (constants being deleted):

$$V = Q/A, \quad (2)$$

$$\dot{m} = pQ, \quad (3)$$

where:
$Q$ is the volumetric flow rate of the fluid;
$A$ is the duct cross-sectional area;
$\dot{m}$ is the mass flow rate;
$p$ is the fluid density.

Straightforward substitution of the second equation into the first equation provides the following relationship:

$$f = KQ/Ad. \quad (4)$$

Accordingly it is seen that the frequency of the periodic vortices is an inverse function of the product quantity $A \times d$.

The present invention includes the compensator in the form of bellows 50 in order to vary the quantity product $A \times d$ in inverse proportional proportion to the fluid density $p$:

$$Ad = 1/p. \quad (5)$$

By then substituting equation 5 into equation 4, the following results:

$$f = KpQ. \quad (6)$$

By comparing equations 3 and 6 it is seen that:

$$f = K\dot{m}. \quad (7)$$

Thus, the frequency of the periodic vortices developed in the present invention is indicative of the mass flow rate. It will be noted by reference to FIGS. 3 and 4 that upon change of the characteristic dimension $d$ by expansion and contraction of the walls 30 and 32, a slight change in area A also results. Accordingly, the bellows 50 and associated actuating structure is arranged such that the product quantity $A \times d$ changes in inverse proportion to the density $p$. By arranging the bluff body 28 relative to section 26 in an appropriate manner, such as by assuring that the width of the section 26 in the direction of dimension $d$ is approximately three times the length of dimension $d$, the percentage change of area A as a result of change in characteristic dimension $d$, is relatively small in comparison to the percentage change of dimension $d$ itself. In this manner, for instance, the density compensator is arranged such that the characteristic dimension $d$ is changed at a rate slightly greater than being simply inversely proportional to the change in density, in order to compensate for the small decrease in area A, all such that the resulting relationship is that the product quantity $A \times d$ is inversely proportional to the change in density.

Figure 6:
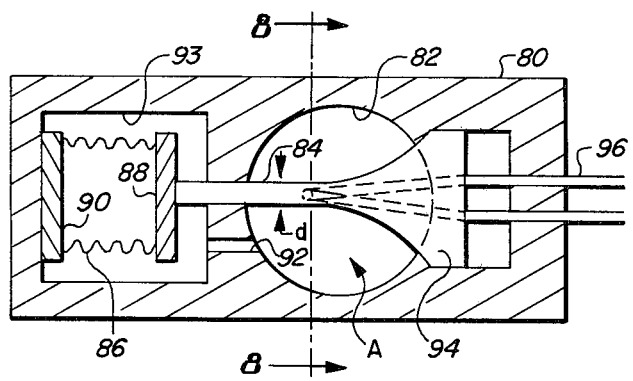
FIG. 6 is a cross-sectional elevational view of another form of the invention.
Figure 7:
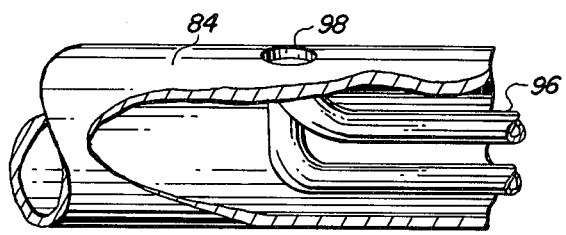
FIG. 7 is an enlarged view of a portion of the bluff body of FIG. 6 with portions broken away to reveal internal details of construction.
Figure 8:
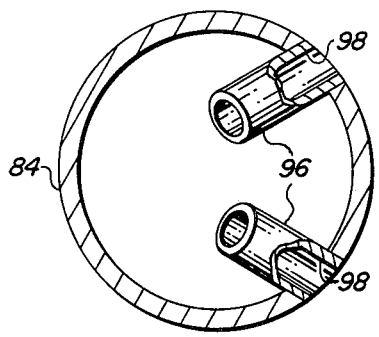
FIG. 8 is a cross-sectional view of the bluff body of FIG. 6 taken along lines 8—8 of FIG. 6.

FIGS. 6–8 illustrate an alternate embodiment of the present invention wherein only the cross-sectional area A is varied in order to provide density compensation. More particularly this arrangement includes a housing 80 defining an interior conduit opening 82 carrying the mass fluid flow, and a cylindrical bluff body 84 disposed within conduit 82 such that the characteristic dimension $d$ of bluff body 84 is in a vertical direction as illustrated in FIG. 6. A density compensating bellows 86 is included which, along with rigid end walls 88 and 90 define an enclosed, trapped volume which contains fluid having like pressure and temperature characteristics as the fluid in conduit 82. Surrounding the bellows is a chamber 93 which communicates with the mass flow in conduit 82 via passageway 92. Associated with bluff body 84 is a piston-type arrangement presenting a barrier element 94. The integral bluff body 84 and barrier 94 are movably mounted in housing 80 and interconnected with end wall 88 to be responsive to changes in mass flow density.

More particularly a change in the mass flow density causes contraction or expansion of bellows 86 in the same manner as bellows 50 of the FIG. 1 arrangement. In response to movement of the bellows, the barrier 94 shift to adjust the cross-sectional area A of the conduit which is carrying the mass flow past the bluff body 84. Barrier 94 is appropriately shaped so that the cross-sectional area A changes in inverse proportion to changes in density of the mass flow. The characteristic dimension $d$ of the bluff body remains unchanged, and therefore the product quantity $A \times d$ is varied in inverse proportion to the density of the mass flow. As a result the frequency of the shed periodic vortices whose pressure fluctuations are sensed by openings 98 on the downstream side of the bluff body and transmitted through sensing tubes 96 to an appropriate transducer, are proportional to mass flow.

Figure 9:
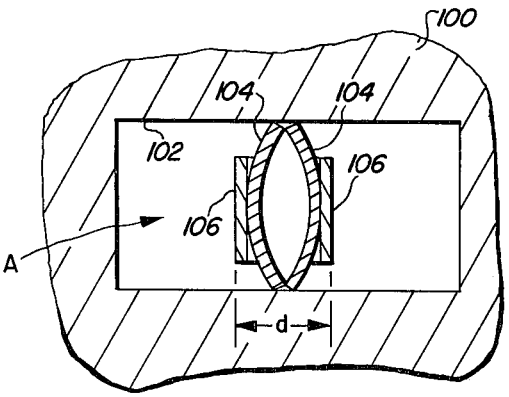
FIG. 9 is a partial cross-sectional elevational view of another modified form of the invention.

FIG. 9 illustrates another alternate form of density compensator in combination with a bluff body substantially similar to that illustrated in FIG. 1. The FIG. 9 arrangement includes a housing 100 defining an internal, rectangular, mass flow carrying conduit 102, and a bluff body generally similar to configuration to that illustrated in FIG. 1 is disposed in conduit 102. More specifically, the bluff body has spaced sidewalls 106 defining the characteristic dimension $d$ therebetween, along with bowing compensator struts 104 therebetween having one or both opposite ends thereof affixed to the housing 100.

In contrast to the compensator-type bellows of the FIG. 1 arrangement, the FIG. 9 structure includes compensator struts 104 which are composed of a bimetallic, thermally responsive material. The compensator struts are responsive to changes in temperatures of the fluid in conduit 102, respectively bowing inwardly and outwardly in response to decrease and increase of temperature of mass flow. Again, the compensator arrangement is such that the product quantity A × d is varied in inverse proportion to the changes in density such that the shedding frequency from the bluff body is indicative of the mass flow rate through the conduit. The FIG. 9 arrangement is particularly useful in sensing the mass flow rate of a substantially incompressible liquid whose density changes substantially only in response to changes in temperature of the liquid.

Figure 10:
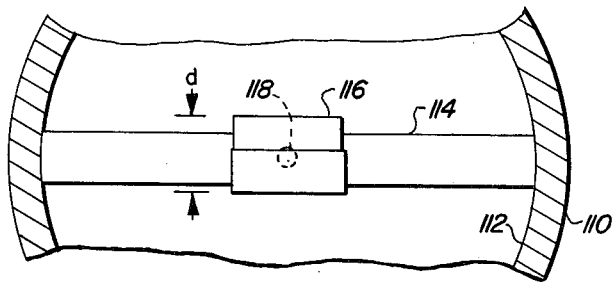
FIG. 10 is a partial cross-sectional view of yet another form of the invention.

FIG. 10 illustrates a further arrangement contemplated by the present invention which includes a housing 110 defining an internal conduit 112 carrying the mass fluid flow, with a bluff body 114 extending across the conduit 112. Particularly for applications wherein the bluff body may be substantially smaller than the size of the flow carrying conduit, the FIG. 10 arrangement is useful in that bluff body 114 has only a portion 116 thereof which changes in size in relation to changes in density of the mass flow. To prevent interference by end effects from the bluff body itself upon the frequency of the vortices, the length of the expandable section 116 in a horizontal direction as illustrated in FIG. 10, it is preferably approximately at least six times the diameter of the sensing opening 118. The FIG. 10 arrangement is constructed in order to operate along the principles discussed previously. From the FIG. 10 arrangement it will be apparent therefore that the entire length of the bluff body need not be expandable, but rather only a sufficient portion thereof to avoid end effects.

It will be apparent that the present invention provides an improved method of sensing mass flow which includes step of producing periodic vortices in the mass flow that are at a frequency which is indicative of the mass flow, along with the step of sensing the frequency of these periodic vortices. Density compensation is a part of the step of producing the desired periodic vortices, and may be accomplished by emplacing a bluff body in the mass flow and then varying the characteristic dimension $d$ of the bluff body in relation to the density of the mass flow. Alternately, density compensation is accomplished by varying the cross-sectional flow area A in relation to the density of the mass flow.

Various alterations and modifications to the foregoing will be apparent to those skilled in the art. Accordingly, the foregoing detailed description of preferred arrangements of the present invention should be considered exemplary in nature and not as limiting to the scope and spirit of the invention as set forth in the appended claim.

Having described the invention with sufficient clarity that those skilled in the art may make and use it, I claim:

1. A mass flow sensor comprising:
   a conduit for carrying mass fluid flow to be sensed;
   a bluff body disposed in said conduit for producing periodic vortices, said body and conduit defining a flow cross-sectional area A therebetween, said body having a characteristic dimension $d$ in a direction substantially perpendicular to the direction of mass flow through the conduit whereby the frequency of said vortices is a function of the product A × $d$;
   means for adjusting the product A × $d$ in relation to the density of said mass flow whereby said frequency is indicative of said mass flow; and
   means for sensing said frequency.

2. A mass flow sensor as set forth in claim 1, wherein said adjusting means includes means for varying said characteristic dimension $d$.

3. A mass flow sensor as set forth in claim 2, wherein said means for varying said characteristic dimension $d$ is operable to vary said characteristic dimension $d$ whereby said product A × $d$ varies in substantially inverse proportion to changes in said density of the mass flow.

4. A mass flow sensor as set forth in claim 1, wherein said adjusting means includes means for varying said cross-sectional area A.

5. A mass flow sensor as set forth in claim 4, wherein said means for varying said cross-sectional area A is operable to vary said cross-sectional area A in substantially inverse proportion to changes in said density of the mass flow.

6. A mass flow sensor as set forth in claim 1, wherein said adjusting means includes movable means operably exposed to said mass flow and movable in relation to changes in said density thereof.

7. A mass flow sensor as set forth in claim 6, wherein said movable means includes an element movable in relation to changes in temperature of said mass flow.

8. A mass flow sensor as set forth in claim 7, wherein said element includes a bimetallic element exposed to said mass flow and movable in response to said changes in temperature.

9. A mass flow sensor as set forth in claim 6, wherein said movable means includes an element movable in relation to changes in temperature and pressure of said mass flow.

10. A mass flow sensor as set forth in claim 9, wherein said element includes a hollowed bellows disposed in a surrounding chamber communicating with said mass flow, whereby said bellows expands and contracts in response to changes in said density of the mass flow.

11. A mass flow sensor as set forth in claim 10, wherein said adjusting means includes flexible expansion means responsive to expansion and contraction of said bellows, said bluff body having a pair of spaced walls defining said characteristic dimension $d$ therebetween, said expansion means operably associated with said spaced walls to vary the spacing therebetween in response to movement of said bellows.

12. A mass flow sensor as set forth in claim 11, wherein said spaced walls are interconnected at first ends thereof in cantilever arrangement.

13. A mass flow sensor as set forth in claim 12, wherein said sensing means includes a sensing tube at said first ends interconnecting said spaced walls, said sensing tube having an opening therein exposed to mass flow downstream of said bluff body for receiving said periodic vortices.

14. A mass flow sensor as set forth in claim 10, wherein said adjusting means includes a piston driven by said bellows, and a barrier carried by said piston movable across said conduit for varying said cross-sectional area A in substantially inverse proportion to changes in said density.

15. A mass flow sensor as set forth in claim 10, wherein said hollowed bellows is sealed and filled with a fluid having temperature characteristics like the fluid of said mass flow.

16. A mass flow sensor as set forth in claim 15, wherein said hollowed bellows is filled with said fluid of the mass flow.

17. A mass flow sensor as set forth in claim 1, wherein said sensing means includes at least one sensing tube having an opening therein exposed to said mass fluid flow downstream of said bluff body for receiving said periodic vortices in a manner generating a pressure signal in said tube fluctuating in response to said frequency of the periodic vortices.

18. A mass flow sensor as set forth in claim 17, wherein at least a portion of said bluff body has said characteristic dimension $d$, the length of said portion being at least approximately six times the diameter of said opening.

19. A mass flow sensor as set forth in claim 17, wherein said sensing means further includes a piezoceramic transducer responsive to said fluctuating pressure signal to produce an electrical output signal having a frequency indicative of said mass flow rate.

20. A mass flow sensor as set forth in claim 19, wherein said sensing means further includes fluidic amplifier means between said sensing tube and said transducer for amplifying the magnitude of said fluctuating pressure signal.

21. A mass flow sensor as set forth in claim 1, wherein said adjusting means is operable to vary said product $A \times d$ in substantially inverse proportion to changes in said density of the mass flow.

22. In combination:
a conduit for carrying mass fluid flow;
a bluff body disposed in said conduit to define a flow area $A$ between said body and said conduit, said body having a characteristic dimension $d$ in a direction substantially perpendicular to the direction of mass fluid flow through said conduit; and
means for adjusting the value of the product quantity $A \times d$ in relation to the density of said mass fluid flow.

23. A combination as set forth in claim 22, wherein said adjusting means includes means for varying said characteristic dimension $d$.

24. A combination as set forth in claim 22, wherein said adjusting means includes means for varying said cross-sectional area $A$.

25. A combination as set forth in claim 22, wherein said adjusting means is operable to vary said product $A \times d$ in substantially inverse proportion to changes in said density of the mass flow.

26. In a mass flow sensor including a conduit for carrying mass fluid flow to be sensed, and means disposed in said conduit for producing periodic vortices, wherein the improvement comprises:
means for altering the frequency of said periodic vortices in relation to the density of said mass fluid flow.

27. In combination with a conduit for carrying a variable density mass fluid flow, a mass flow sensor comprising:
means operably associated with said conduit and responsive to the density of said mass fluid flow for producing period vortices in said mass fluid whose frequency is indicative of said mass fluid flow regardless of variations in said density; and
means for sensing said frequency of the periodic vortices.

28. A device for sensing the mass flow of a fluid varying in density comprising:
means for producing periodic vortices in the mass flow at a frequency indicative of said mass flow regardless of variations in said density; and
means for sensing said frequency of the periodic vortices.

29. A method of sensing mass flow comprising the steps of:
allowing the density of the mass flow to vary;
producing periodic vortices in the mass flow at a frequency indicative of the mass flow regardless of variations in the density thereof; and
sensing the frequency of the periodic vortices.

30. A method of sensing mass flow comprising the steps of: producing periodic vortices in the mass flow at a frequency indicative of the mass flow; and sensing the frequency of the periodic vortices, said producing step including emplacing in said mass flow a bluff body having a characteristic dimension $d$ in a direction substantially perpendicular to the direction of mass flow, and varying said characteristic dimension $d$ in relation to the density of said mass flow.

31. A method as set forth in claim 30, wherein said bluff body is emplaced in a conduit carrying said mass flow to define a cross-sectional flow area $A$ between said conduit and said body, said varying step operable to vary the product quantity $A \times d$ in inverse relation to said density of the mass flow.

32. A method of sensing mass flow comprising the steps of: producing periodic vortices in the mass flow at a frequency indicative of the mass flow; and sensing the frequency of the periodic vortices, said producing step including emplacing a bluff body in a conduit carrying said mass flow to define a cross-sectional flow area $A$ between said conduit and said body, and varying said cross-sectional flow area $A$ in relation to the density of said mass flow.

33. A method as set fort in claim 32, wherein said cross-sectional flow area $A$ is varied inversely to the density of said mass flow.

34. A method of sensing mass flow, comprising the steps of:
producing periodic vortices in the mass flow;
sensing density of the mass flow; and
altering the frequency of the peridic vortices in relation to the sensed density.

35. A mass flow sensor comprising:
means for producing periodic vortices in the mass flow; and
means for altering the frequency of said periodic vortices in relation to the density of said mass flow.

36. In combination:
a conduit for carrying mass fluid flow;
means for sensing a preselected parameter of said mass fluid flow;
a bluff body disposed in said conduit to define a flow area $A$ between said body and said conduit, said body having a characteristic dimension $d$ in a direction substantially perpendicular to the direction of mass fluid flow through said conduit; and
means for adjusting the value of the product quantity $A \times d$ in relation to variations in said sensed parameter.

* * * * *

UNITED STATES PATENT AND TRADEMARK OFFICE
CERTIFICATE OF CORRECTION

PATENT NO. : 4,116,060
DATED : Sep. 26, 1978
INVENTOR(S) : GARY L. FREDERICK

It is certified that error appears in the above-identified patent and that said Letters Patent are hereby corrected as shown below:

Column 2, line 27, read "steam" as --stream--.

Column 5, line 60, equation (7) should read:
--$f = K\dot{m}$--.

Signed and Sealed this

Twelfth Day of December 1978

[SEAL]

Attest:

RUTH C. MASON
Attesting Officer

DONALD W. BANNER
Commissioner of Patents and Trademarks